United States Patent [19]
Warner

[11] 3,776,525
[45] Dec. 4, 1973

[54] INJECTION PROCESS
[76] Inventor: James Warner, 2732 Hallister Ter., Glendale, Calif. 91206
[22] Filed: Mar. 26, 1973
[21] Appl. No.: 344,860

[52] U.S. Cl. .................................. 259/7, 259/149
[51] Int. Cl. ........ B01f 3/10, B01f 5/04, B01f 15/04
[58] Field of Search.................... 259/107, 109, 110, 259/148, 149, 7, 9, 10

[56] References Cited
UNITED STATES PATENTS

| | | | |
|---|---|---|---|
| 3,203,675 | 8/1965 | Ward | 259/7 |
| 3,214,144 | 10/1965 | Gugel et al. | 259/7 |
| 3,472,491 | 10/1969 | Feder | 259/9 |
| 3,595,627 | 7/1971 | Abbott et al. | 259/9 |
| 3,727,892 | 4/1973 | Notte et al. | 259/10 |

*Primary Examiner*—William I. Price
*Attorney*—Vernon D. Beehler et al.

[57] ABSTRACT

A method of injecting a plural component synthetic resin into a site where pressure and other conditions vary. A very high viscosity non-Newtonian fluid and a relatively low viscosity fluid are accurately metered in a proportioning pump system so that a small amount of the thin fluid and a large amount of the viscous fluid are supplied simultaneously to a blending device. Heat generating conditions of viscous shear are utilized in the blending device so that there is a substantial reduction in pressure across the blending device and a substantial elevation in temperature due to the internal heat generated by the viscous shear. The pressure on the resultant admixture is measured at the injection site, and the rate of fluid flow is adjusted to maintain that pressure at an approximate predetermined value. Injection is carried out at a predetermined elevated temperature. A substantial proportion of the heat required to elevate the temperature to the desired value is generated by viscous shear within the viscous component.

11 Claims, 5 Drawing Figures

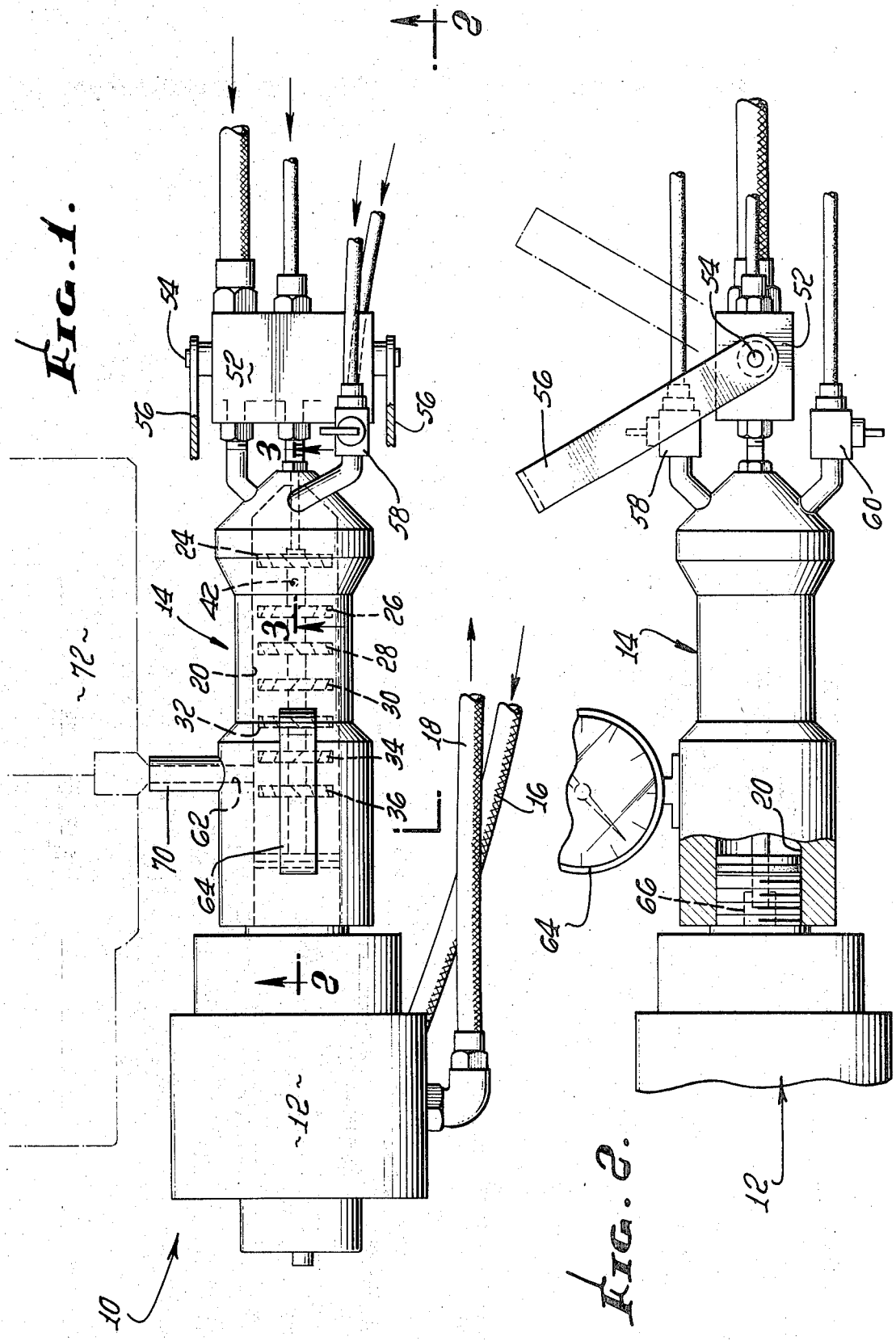

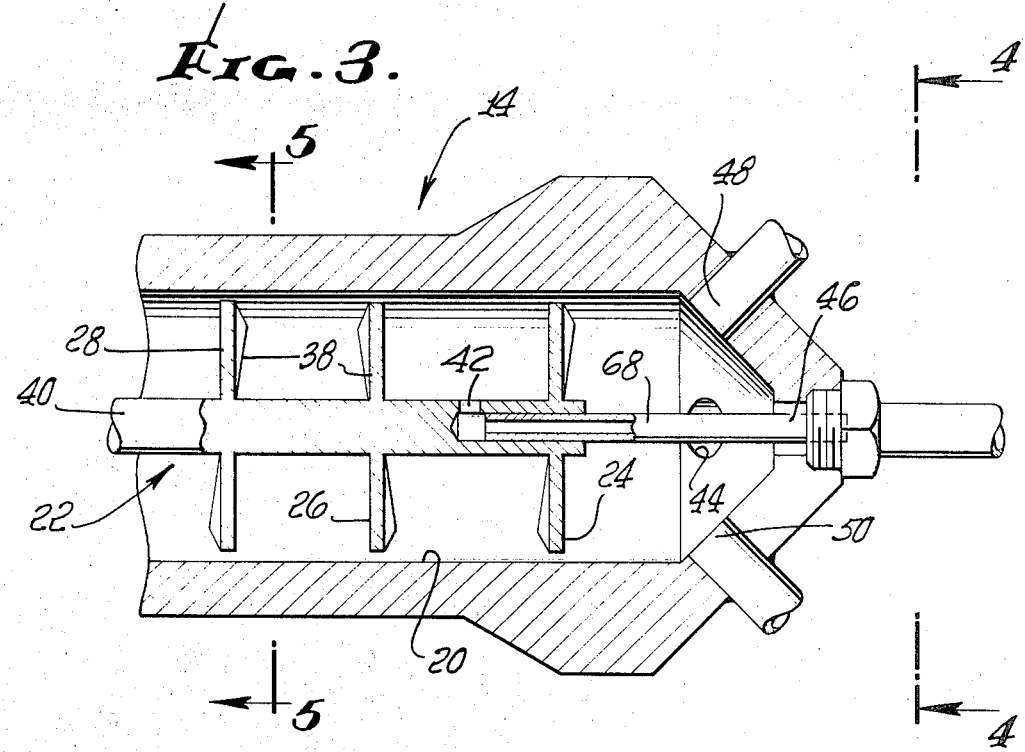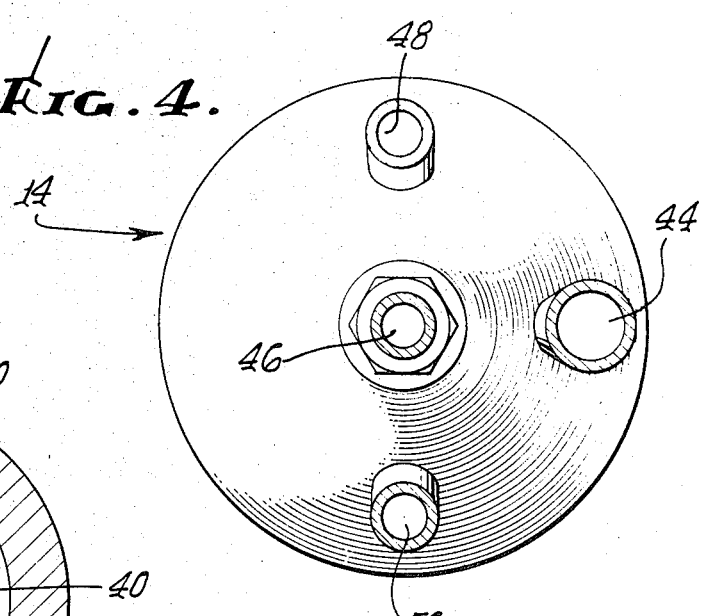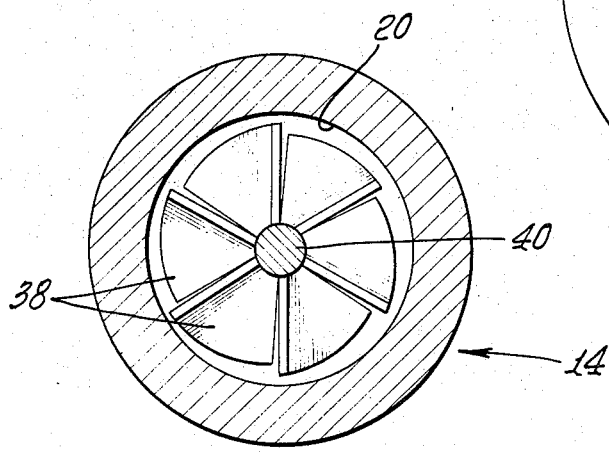

INJECTION PROCESS

Previously, considerable difficulty was experienced in the pressure injection of grout materials and particularly synthetic resins into unprepared sites. Particular difficulty had been experienced in the pressure injection of foaming synthetic resins into structural cracks and voids in concrete and masonry structures. This problem is particularly acute where concrete and masonry structures sustain damage due to movement caused by such factors as earth slippage or earthquakes. Where the structure is not sufficiently damaged to necessitate complete demolition, restoration must of necessity include the rebonding of the damaged sections.

According to the present invention, rebonding of structural cracks and voids in concrete and masonry structures is accomplished utilizing a multireactant synthetic resin. In general the multireactant synthetic resins used in the present process comprise at least one extremely viscous non-Newtonian fluid loaded with substantial portions of solids and semisolids and which is conveniently described as being a generally liquid reactant. A second component of the multireactant synthetic resin is generally a low viscosity fluid. The proportions of the two generally liquid reactants required to produce the desired synthetic resin are such that the quantity of the high viscosity reactant is at least about 5 times greater than the quantity of the low viscosity reactant. The proportion of high viscosity reactant generally ranges from about 5 to 30 times greater than the quantity of the low viscosity reactant and is usually in the range of from about 10 to 15 times greater. A proportioning pump system is used to supply the generally liquid reactants to a mixing or blending station in a precise predetermined ratio. The proportioning pump system employs positive displacement pumps so that the ratios of the reactants may be maintained at predetermined values. The proportioning pump system is controlled so that the rate of flow from this system may be varied throughout a wide range without changing the proportions of the reactants that are discharged from the proportioning pump system.

The reactants are directed as independent pressurized streams into a blending device wherein the streams are combined and blended together to produce a synthetic resin having the desired characteristics. The admixture of reactants that is produced in the blending device is injected into a generally predetermined location.

Injecting fluid materials into cracks or voids in a damaged structure requires that the injection system and procedure be adopted to accommodate a wide variety of conditions within the structure. The pressure within the structure against which the reactants must be injected varies widely depending upon the characteristics of the cracks and voids into which the intimate admixture of reactants must be forced to flow. The intimate admixture must penetrate the cracks and voids with ease.

According to the present invention, the pressure on the intimate admixture of reactants in the blending device immediately adjacent the injection port is monitored, and the flow rate of the reactants is adjusted so as to maintain this pressure at approximately a constant predetermined value. When this pressure declines from the predetermined value, the pumping rate is increased so as to increase the rate of flow and elevate the pressure. When the pressure rises, the pumping rate is decreased so that the rate of flow decreases and the pressure declines to the predetermined value.

The blending conditions in the blending device or mixing station are sufficiently severe to insure that a substantially homogeneous admixture will be produced in the blending device. The conditions are such that the internal heat generated in the highly viscous fluid alone due to viscous shear is sufficient to elevate the temperature of the highly viscous component by at least about 3° F. Also, the pressure drop across the blending device is at least about 5 pounds per square inch. These values are determined by pumping only the highly viscous reactant through the system so as to avoid the influences of the heat generated by the reaction of the reactants as well as any volumetric changes produced by that reaction. The temperature elevation due to the internal generation of heat by viscous shear decreases the viscosity of the admixture and also increases the rate of reaction. The penetrability of the admixture is also improved by the violent blending action immediately prior to injection. The ability of the intimate admixture of reactants to penetrate through cracks and voids for a substantial distance away from the injection site improves as the violence of the mixing or blending is increased.

In general, it is desired to elevate the temperature of the reactants to some predetermined value and to inject them at that temperature. The rate of reaction and the viscosity of the materials at the time of injection are controlled by operating at a predetermined injection temperature. In addition to the temperature rise induced by mixing or blending at the mixing station, it may be desirable to preheat at least the highly viscous material before it is supplied to the proportioning pump system. This preheating is conveniently accomplished by stirring the highly viscous material under conditions of viscous shear so as to generate heat internally in the highly viscous material. It has been found that preheating the highly viscous material by mixing improves the penetrability of the intimate admixture over that of an otherwise equivalent system where preheating is accomplished by heat transfer from some external source. Also, the highly viscous material is generally loaded with solids and semisolids so that stirring improves the homogeneity of the reactant.

The pressure under which the material is injected is generally provided by the proportioning pump system and is carried through the blending device to the injection location. The highly viscous material experiences a pressure drop in the lines leading to the blending or mixing device which is generally proportionate to the length of the line at a given pumping pressure. The maximum injection pressure is generally dictated by the nature of the structure into which the reactants are being injected. In general, concrete and masonry structures will be damaged if the injection pressure is allowed to rise above approximately 40 pounds per square inch. In general, the pressure drop across the mixing device ranges from approximately 5 to 30 pounds per square inch. Because of the pressure drops in the lines and across the blending device, it is generally desirable to provide a proportioning pump system which will deliver upwards of 250 pounds per square inch on the outlet side of the pump. A pump pressure of 250 pounds per square inch is generally sufficient to insure that it will be possible to maintain an injection pressure of approximately 40 pounds per square inch, if desired.

The capacity of the system to operate continuously using an in-line mixer as the blending device with a fixed predetermined ratio of reactants to one another, while maintaining the injection temperature and pressure at approximately predetermined values assures that the structural repairs will be of a predictable, uniform quality and characteristic.

In the drawings there is illustrated:

FIG. 1, a plan view of an embodiment of the in-line mixing equipment according to this invention;

FIG. 2, a partial elevational view of a mixer taken along line 2—2 of FIG. 1;

FIG. 3, a partial elevational cross section of the mixer illustrated in FIG. 1;

FIG. 4, a front elevation sectional view taken along line 4—4 of FIG. 3; and

FIG. 5, a front elevation sectional view taken along line 5—5 in FIG. 3.

In-line mixer 10 includes an air motor 12 and a barrel 14. Air motor 12 is connected with a suitable source of air (not shown) for driving purposes by means of air supply line 16. Air exhaust line 18 carries away spent air. Barrel 14 is provided with an internal bore 20, which extends axially of barrel 14. Rotor 22 is rotatably mounted in internal bore 20. Barrel 14 is threadably connected to air motor 12 so that internal bore 20 extends coaxially with the drive shaft of air motor 12. Rotor 22 is provided with flights of vanes 24, 26, 28, 30, 32, 34, and 36. Each of the flights of vanes 24 through 36 is provided with a plurality of blades 38. The flights of vanes 24 through 36 respectively are mounted on shaft 40 and project radially therefrom at longitudinally spaced locations. One end of shaft 40 is removably connected to the drive shaft of air motor 12 by means of drive coupling 66. The remote end of shaft 40 is journaled on hollow support shaft 68. Inlet port 42 is provided adjacent the first flight of vanes 24 between the flights of vanes 26 and 24. Inlet port 42 opens radially into the axial opening of shaft 40 and communicates with the axial opening of hollow support shaft 68. The end of barrel 14, which is axially remote from the threaded connection to air motor 12, is provided with first reactant port 44, second reactant port 46, first purge port 48, and second purge port 50. Each of ports 44 through 50, respectively, opens into internal bore 20 on the axially remote side of first flight of vanes 24. The lines to which reactant ports 44 and 46, respectively, are connected exteriorly of barrel 14 are provided with ganged valves 52. Ganged valves 52 are mounted on axially aligned shafts 54 and are actuated by a common actuating handle 56. Ganged valves 52 are mechanically linked together so that they are opened and closed together. Provisions are made for purging in-line mixer 10 in that purge ports 48 and 50 are connected with suitable sources of purging fluid (not shown) by means of lines attached to purge ports 48 and 50, respectively. The flow of purging fluid to first purge port 48 is controlled by first purge valve 58, and the flow of purging fluid to second purge port 50 is controlled by second purging valve 60. A discharge port 62 opens radially through barrel 14 between sixth flight of vanes 34 and seventh flight of vanes 36. Discharge port 62 is connected to an injection location indicated generally at 72 by means of injection coupling 70. A pressure gauge 64 is provided on barrel 14 for visually indicating the pressure within internal bore 20.

In operation, in-line mixer 10 is particularly adapted for use in injecting a multireactant synthetic resin against a varying discharge pressure in injection location 72. In-line mixer 10 is particularly well adapted for use with foaming synthetic resins where the reactants are brought together under pressure and intimately blended together under conditions of extremely violent viscous shear and stream splitting immediately prior to being injected into injection location 72.

In-line mixer 10 is placed in operation by actuating air motor 12 which acts through drive coupling 66 to cause the rotation of rotor 22 within internal bore 20 of barrel 14. Actuating handle 56 is moved so that ganged valves 52 are moved by common shaft 54 from their closed configuration to their open configuration. Previously pressurized reactants from sources not shown are thereby permitted to flow simultaneously through first and second reactant ports 44 and 46, respectively. Generally, a high viscosity reactant is allowed to flow under pressure into first reactant port 44, and a low viscosity reactant is allowed to flow into second reactant port 46. First reactant port 44 discharges directly into the axially remote end of internal bore 20, while second reactant port 46 discharges into the axially hollow interior of support shaft 68 which in turn discharges into the axially hollow portion of shaft 40 and through radially opening inlet port 42. Alternate flights of vanes 24 through 36, respectively, are arranged so that their respective blades 38 are offset from the respective planes of the flights of vanes in alternate directions. For example, the blades in first flight of vanes 24 are offset laterally from the plane of first flight of vanes 24 so that when shaft 40 is rotated clockwise, as viewed in FIG. 5, the leading edges of blade 38 extend generally toward the remote end of barrel 14, and the trailing edges of blades 38 extend generally toward the other end of barrel 14. By contrast, the blades of second flight of vanes 26 are twisted out of the plane of second flight of vanes 26 so that upon the counterrotation of shaft 40, as viewed in FIG. 5, from the remote end of barrel 14 the leading edges of blades 38 extend toward the other end of barrel 14 and the trailing edges of blades 38 extend toward the remote end of barrel 14. This arrangement of alternating blade arrangements is continued throughout the balance of flights of vanes. The reactants are forced through in-line mixer 10, responsive to the pressure supplied by remote sources (not shown) that act independently upon the respective reactants before they enter ports 44 and 46, respectively. The reactants are subjected to violent forces by the action of the counterset blades of rotor 22 as they are forced through the in-line mixer 10. The blending action is so violent that the temperature of the admixture is elevated substantially above the temperature of the independent reactants by the time it reaches discharge port 62.

In general, the flow of the reactants through the in-line mixer occurs primarily between the blades 38. In one embodiment the openings between blades 38 are approximately one-sixteenth of 1 inch, and the diameter of the bore is approximately 1½ inches. Seven flights of vanes are provided, and the internal bore is approximately 10 inches long. The reactants employed are widely diverse in their viscosities and proportions. The reactants are supplied by a proportioning pump system (not shown) under positive pressures such that the resultant admixture consists of approximately 5 percent of the low viscosity reactant and about 95 percent of the high viscosity reactant. The viscosity of the low viscosity reactant is approximately 10 centipoises, and the viscosity of the high viscosity reactant is approximately 30,000 centipoises in this specific embodiment.

After injection is complete at injection location 72, injection coupling 70 is disconnected and moved to another injection location, or purge valves 58 and 60, respectively, are opened as desired, and ganged valves 52 are closed. When purging of the system is complete, purge valves 58 and 60, respectively, are closed, and the air supply to air motor 12 is discontinued.

The generally liquid reactants may include substantial quantities of solid phase material; such as, for example, blowing agents, extenders, pigments, fillers, and the like.

The proportioning pump systems, according to this invention, are comprised of conventional metering pumps possessed of positive displacement characteristics so that the quantities of the various generally liquid reactants that are supplied to the in-line mixer 10 may be carefully controlled and proportioned at such predetermined ratios as may be desired. The pressure from these positive displacement metering pumps is carried through and is the expelling force which drives the blended admixture out of the discharge port 62.

The present invention is particularly applicable to those multireactant synthetic resin systems in which the high viscosity reactant is employed in quantities of at least about 5 and preferably approximately at least 10 times greater than the quantity of the low viscosity reactant.

The continuous blending is carried out under such violent conditions that, in addition to providing an intimate admixture of the reactants, the temperature of the admixture is elevated above that of the individual reactants as supplied to the in-line mixer 10 by at least about 3° F. and preferably at least about 5° to 10° F. Blending is generally accomplished within a period of approximately 8 seconds and preferably within a period of less than approximately 3 seconds. The pressures at which the reactants are supplied to the in-line mixer are generally approximately equal and range from about 10 to about 50 pounds per square inch at the mixer inlet. The viscosity of the high viscosity reactant is generally at least approximately 100 times greater than the viscosity of the low viscosity reactant and may be as much as approximately several thousand times greater than the viscosity of the low viscosity reactant. The viscosities of the reactants are conveniently expressed in centipoises.

When it is not possible to accomplish the desired amount of temperature elevation in the in-line mixer, the high viscous reactant may be preheated. In general, it has been found that injection of the material is facilitated if the preheating of the high viscous reactant is accomplished through vigorous stirring before the high viscosity reactant is supplied to the proportioning pump system.

The present invention is applicable to a wide variety of materials and is particularly applicable to multicomponent synthetic resins; such as, epoxy, polyester, polyurethane, and the like. Epoxy foam resin systems are particularly well suited for use in the practice of the present invention. The viscosity at 60° F. of the high viscosity components of resin systems, such as epoxy ceramic foaming resins, ranges from approximately 30,000 centipoises to 100,000 centipoises or more. In general, the viscosity of the low viscosity reactant at 60° F. does not exceed 500 centipoises and is usually less than 300 centipoises. The viscosity of the high viscosity reactant is usually at least approximately 50 times greater than the viscosity of the low viscosity reactant and is usually at least 100 times greater. The reactants are proportioned as is necessary to produce the desired synthetic resin. In general, the high viscosity generally liquid reactant constitutes a major proportion of the combined reactants. The proportions by volume of the reactants may range from 2 to 20 or more parts by volume of the low viscosity reactant to 100 parts by volume of the high viscosity reactant, but preferably the low viscosity reactant ranges from 3 to 9 parts by volume to 100 parts by volume of the high viscosity reactant.

The heat generated internally of the admixture in the blending device is generally sufficient to raise the temperature of the high viscosity reactant by an amount ranging from about 5° to 20° F.

The reactive admixture from the blending device is injected immediately into the predetermined injection site so that it will have time to flow and penetrate through the structure before the chemical reaction is complete.

The pressure drop and temperature rise across the blending device is measured using only the high viscosity component for test and calibration purposes so that the heat of reaction and volumetric changes due to the reaction do not interfere with the measurement of pressure and temperature change. In determining the desired degree of mixing or stirring, consideration is given to the degree of penetrability of the reactive admixture into the wall as determined by taking core samples from test sites. If adequate penetration can be achieved at a predetermined temperature and pressure without inducing the temperature rise entirely by viscous shear within the viscous material, the reactants may be preheated by conventional heat transfer techniques, if desired. It is not possible, however, to achieve the desired degree of penetrability without altering the rheological properties of the material by mixing or stirring prior to injection.

The pressure at the injection site is measured adjacent the injection port. As illustrated in the drawings, this pressure is measured adjacent discharge port 62 by pressure gauge 64 on the upstream side of the system.

In general the rate at which reactants are supplied to the blender is controlled so as to achieve an approximately constant pressure at the injection site. In some circumstances where there is a small volume of void space to be filled in a damaged structure, the void space is filled so rapidly that the injection system never reaches a steady state. The pumping is carried out at a constant rate while the pressure increases to some maximum predetermined value at which point pumping is discontinued.

The injection sites are prepared as to the injection location so as to provide a means for connecting the system of the present invention to the structure which is to receive the injection. Certain other procedures, such as vacuuming dust from structure cracks and sealing cracks or other openings in the surface of the structure, may be carried out prior to injection, if desired.

What is claimed is:

1. Method for injecting a multireactant synthetic resin against a varying discharge pressure comprising:
   selecting separate generally liquid reactants, which generally liquid reactants are adapted to being admixed and reacted together to form a synthetic resin, said generally liquid reactants including at least one low viscosity reactant and at least one high viscosity reactant, the viscosity of said high viscosity reactant being at least approximately 50 times greater than the viscosity of said low viscosity reactant, said viscosities being expressed in centipoises;
   continuously supplying each of said generally liquid reactants to a mixing station under positive pressure, the quantities of said generally liquid reactants that are supplied to said mixing station being proportioned in a predetermined ratio so that the quantity of said high viscosity reactant is at least about 5 times greater than the quantity of said low viscosity reactant;
   continuously blending said generally liquid reactants at said mixing station under conditions sufficient to elevate the temperature of said high viscosity reactant by at least about 3° F.; and
   continuously injecting the resultant heated admixture responsive to said positive pressure into a predetermined location.

2. A method for injecting a multireactant synthetic resin according to claim 1 including injecting the resultant heated admixture at an approximate predetermined temperature and preheating at least the high viscosity reactant prior to blending the generally liquid reactants to such a temperature that the elevation of the temperature during said blending is sufficient to achieve said approximate predetermined temperature.

3. A method for injecting a multireactant synthetic resin according to claim 2 wherein said preheating is accomplished by subjecting the generally liquid high viscosity reactant to mechanical stirring of sufficient intensity to cause said preheating.

4. A method for injecting a multireactant synthetic resin according to claim 1 including conducting the blending of the generally liquid reactants under conditions such that the elevation of temperature of the resultant admixture is caused substantially entirely by said blending.

5. A method for injecting a multireactant synthetic resin according to claim 1 including determining the pressure exerted by the resultant heated admixture prior to injecting said resultant heated admixture and adjusting the flow rate of the generally liquid reactants to the mixing station to maintain said pressure at approximately a predetermined value.

6. A method for injecting a multireactant synthetic resin according to claim 1 wherein the generally liquid reactants are blended at the mixing station under conditions sufficient to elevate the temperature of the resultant admixture by at least about 5° F. and reduce the pressure by at least about 5 pounds per square inch.

7. A method comprising the steps of:
   selecting a plurality of independent fluid components, which fluid components are adapted to being reacted together to produce a synthetic foaming resin, at least one of said fluid components being a high viscosity, non-Newtonian fluid having a viscosity in excess of approximately 30,000 centipoises at about 60° F., and at least one other of said fluid components being a low viscosity fluid having a viscosity of less than approximately 300 centipoises at about 60° F.;
   supplying said independent fluid components to a positive displacement proportioning pump system;
   operating said positive displacement proportioning pump system to provide said high viscosity, non-Newtonian fluid and said low viscosity fluid to a blending device in proportions of at least about 5 to 1, respectively;
   blending said fluid components into an intimate admixture in said blending device under conditions of heat generating viscous shear sufficient to elevate the temperature of the said high viscosity, non-Newtonian fluid by at least about 5° F.;
   discharging said intimate admixture from said blending device;
   determining the pressure on said intimate admixture adjacent the location where said intimate admixture is discharged from said blending device; and
   maintaining said pressure at approximately a predetermined value by adjusting the rate of flow of said fluid components to said blending device.

8. A method of claim 7 including generating sufficient heat by viscous shear in the high viscosity, non-Newtonian fluid during the practice of said method to elevate the temperature of said high viscosity, non-Newtonian fluid by at least about 10° F.

9. A method of claim 7 including maintaining the pressure on the intimate admixture adjacent the location where the intimate admixture is discharged from the blending device at between about 5 and 40 pounds per square inch and wherein a pressure drop across said blending device is at least 5 pounds per square inch.

10. A method comprising the steps of:
    selecting a plurality of independent fluid components, which fluid components are adapted to being reacted together to produce a synthetic resin;
    supplying said independent fluid components to a proportioning pump system;
    operating said proportioning pump system to supply said independent fluid components to a blending device in a predetermined ratio;
    blending said fluid components into an intimate admixture in said blending device under conditions sufficient to elevate the temperature of said fluid components by at least about 5° F.;
    discharging said intimate admixture from said blending device;
    determining the pressure on said intimate admixture adjacent the location where said intimate admixture is discharged from said blending device; and
    maintaining said pressure at approximately a predetermined value by adjusting the rate of flow of said fluid components to said blending device.

11. A method comprising the steps of:
    selecting a plurality of independent fluid components, which fluid components are adapted to being reacted together to produce a synthetic resin;
    supplying said independent fluid components to a proportioning pump system;
    operating said proportioning pump system to supply said independent fluid components to a blending device in a predetermined ratio;
    blending said fluid components into an intimate admixture in said blending device under conditions sufficient to elevate the temperature of said fluid components by at least about 5° F.;

discharging said intimate admixture from said blending device;

determining the pressure on said intimate admixture adjacent the location where said intimate admixture is discharged from said blending device; and maintaining said pressure at a value up to an approximate predetermined value by adjusting the rate of flow of said fluid components to said blending device.

* * * * *